(12) United States Patent
Stenger

(10) Patent No.: US 10,348,938 B2
(45) Date of Patent: Jul. 9, 2019

(54) DISPLAY TIMING DETERMINATION DEVICE, DISPLAY TIMING DETERMINATION METHOD, AND PROGRAM

(71) Applicant: Rakuten, Inc., Tokyo (JP)

(72) Inventor: Bjorn Stenger, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 16/091,107

(22) PCT Filed: Aug. 31, 2017

(86) PCT No.: PCT/JP2017/031368
§ 371 (c)(1),
(2) Date: Oct. 4, 2018

(87) PCT Pub. No.: WO2019/043871
PCT Pub. Date: Mar. 7, 2019

(65) Prior Publication Data
US 2019/0132491 A1 May 2, 2019

(51) Int. Cl.
*H04N 5/04* (2006.01)
*H04N 5/60* (2006.01)

(52) U.S. Cl.
CPC ............... *H04N 5/04* (2013.01); *H04N 5/60* (2013.01)

(58) Field of Classification Search
CPC ............ H04N 21/435; H04N 21/2368; H04N 21/4884; H04N 21/4341; H04N 5/04; H04N 5/60; H04N 7/0882; H04N 7/0885; H04N 21/4307; H04N 21/4305; H04N 21/233; H04N 21/4394; H04N 21/4331
USPC ....... 348/515, 512, 462, 467, 468, 480–485; 725/18, 40, 32, 42, 137
See application file for complete search history.

(56) References Cited

U.S. PATENT DOCUMENTS

2007/0211168 A1* 9/2007 Ko ..................... H04N 5/44513
348/462

FOREIGN PATENT DOCUMENTS

JP 2008-172421 A 7/2008

\* cited by examiner

*Primary Examiner* — Sherrie Hsia
(74) *Attorney, Agent, or Firm* — HEA Law PLLC

(57) ABSTRACT

First ratio acquisition means of a display timing determination device acquires, for each voice, a first ratio that relates to intervals between output timings of voices. Second ratio acquisition means acquires, for each piece of character information, a second ratio that relates to intervals between provisional display timings of pieces of character information. Identification means identifies, based on the first ratio of each voice and the second ratio of each piece of character information, an association relationship between the voice and the piece of character information. Display timing determination means determines a definitive display timing of each piece of character information based on the association relationship.

10 Claims, 8 Drawing Sheets

FIG.5

| CHARACTER INFORMATION ID | START TIMING | END TIMING | DISPLAY TIME | CHARACTER INFORMATION |
|---|---|---|---|---|
| 1 | 0:01:26 | 0:01:29 | 0:00:03 | Hi! I'm Tom. |
| 2 | 0:01:35 | 0:01:40 | 0:00:05 | Nice to meet you. |
| 3 | 0:01:50 | 0:01:53 | 0:00:03 | Nice to meet you, too. |
| 4 | 0:02:02 | 0:02:08 | 0:00:06 | I'm Michel. |
| 5 | 0:02:15 | 0:02:20 | 0:00:05 | CIA |
| ... | ... | ... | ... | ... |

DISPLAY TIMING DETERMINATION DEVICE, DISPLAY TIMING DETERMINATION METHOD, AND PROGRAM

CROSS REFERENCE TO RELATED APPLICATIONS

This application is a National Stage of International Application No. PCT/JP2017/031368 filed on Aug. 31, 2017. The contents of the above document is incorporated herein by reference in its entirety.

TECHNICAL FIELD

The present invention relates to a display timing determination device, a display timing determination method, and a program.

BACKGROUND ART

Hitherto, there has been known a technology of displaying character information (e.g., subtitles) representing each voice every time the voice is output during reproduction of voice storage data (e.g., moving image data) storing a plurality of voices to be output sequentially.

For example, in Patent Literature 1, there is described a system configured to create character information representing voices of a cast and provide viewers with the character information in a live TV program. In this system, a TV editor who has heard a voice in the live program manually creates characters. Thus, even when an interval between timings of outputting voices and an interval between timings of displaying pieces of character information are roughly synchronized with each other, the display timing of a piece of character information is delayed overall relative to the output timing of a voice by a period of time required for manually inputting characters. In this respect, in the technology of Patent Literature 1, when a live TV program is recorded, the delay time is estimated based on a genre code of the TV program, and the display timing of a character is changed overall to an earlier time at the time of recording by a delay time that depends on the genre code.

CITATION LIST

Patent Literature

[PTL 1] JP 2008-172421 A

SUMMARY OF INVENTION

Technical Problem

In the technology of Patent Literature 1, the delay time is estimated through use of the genre code of a TV program, and thus the output timing of a voice and the display timing of character information cannot be synchronized with each other without the genre code. In this respect, when an association relationship between a voice and character information can be identified, it is possible to adjust the display timing of character information so that the display timing is synchronized with the output timing of a corresponding voice even without such information as the genre code.

However, when voice storage data is changed after creation of the character information, the output timing of a voice is changed, which means that a voice and a piece of character information that are close to each other in terms of timing are not always associated with each other. That is, the output timing of a voice is influenced by the change of voice storage data, and thus, with a simple comparison between the output timing of a voice and the display timing of character information, it is difficult to identify an association relationship between the voice and the character information, and the output timing of a voice and the display timing of character information cannot be synchronized with each other.

The present invention has been made in view of the above-mentioned problem, and an object thereof is to accurately identify an association relationship between a voice and character information without being influenced by change of voice storage data, to synchronize an output timing of a voice and a display timing of character information.

Solution to Problem

In order to solve the above-mentioned problem, a display timing determination device according to one embodiment of the present invention includes: output timing acquisition means for acquiring respective output timings of a plurality of voices to be output sequentially; first ratio acquisition means for acquiring, for each voice, a first ratio of an interval between output timings of voices that are different in output order by a first order difference to an interval between output timings of voices that are different in output order by a second order difference; provisional display timing acquisition means for acquiring provisional display timings of pieces of character information, which are sequentially displayed during reproduction of the plurality of voices and represent content of the respective plurality of voices; second ratio acquisition means for acquiring, for each piece of character information, a second ratio of an interval between provisional display timings of pieces of character information that are different in display order by the first order difference or a third order difference corresponding to the first order difference to an interval between provisional display timings of pieces of character information that are different in display order by the second order difference or a fourth order difference corresponding to the second order difference; identification means for identifying, based on the first ratio of each voice and the second ratio of each piece of character information, an association relationship between the voice and the piece of character information; and display timing determination means for determining a definitive display timing of each piece of character information based on the association relationship.

A display timing determination method according to one embodiment of the present invention includes: an output timing acquisition step of acquiring respective output timings of a plurality of voices to be output sequentially; a first ratio acquisition step of acquiring, for each voice, a first ratio of an interval between output timings of voices that are different in output order by a first order difference to an interval between output timings of voices that are different in output order by a second order difference; a provisional display timing acquisition step of acquiring provisional display timings of pieces of character information, which are sequentially displayed during reproduction of the plurality of voices and represent content of the respective plurality of voices; a second ratio acquisition step of acquiring, for each piece of character information, a second ratio of an interval between provisional display timings of pieces of character information that are different in display order by the first order difference or a third order difference corresponding to the first order difference to an interval between provisional display timings of pieces of character information that are different in display order by the second order difference or a fourth order difference corresponding to the second order difference; an identification step of identifying, based on the first ratio of each voice and the second ratio of each piece of character information, an association relationship between the voice and the piece of character information; and a display timing determination step of determining a definitive display timing of each piece of character information based on the association relationship.

A program according to one embodiment of the present invention causes a computer to function as: output timing acquisition means for acquiring respective output timings of a plurality of voices to be output sequentially; first ratio acquisition means for acquiring, for each voice, a first ratio of an interval between output timings of voices that are different in output order by a first order difference to an interval between output timings of voices that are different in output order by a second order difference; provisional display timing acquisition means for acquiring provisional display timings of pieces of character information, which are sequentially displayed during reproduction of the plurality of voices and represent content of the respective plurality of voices; second ratio acquisition means for acquiring, for each piece of character information, a second ratio of an interval between provisional display timings of pieces of character information that are different in display order by the first order difference or a third order difference corresponding to the first order difference to an interval between provisional display timings of pieces of character information that are different in display order by the second order difference or a fourth order difference corresponding to the second order difference; identification means for identifying, based on the first ratio of each voice and the second ratio of each piece of character information, an association relationship between the voice and the piece of character information; and display timing determination means for determining a definitive display timing of each piece of character information based on the association relationship.

Further, an information storage medium according to one embodiment of the present invention is a computer-readable information storage medium having the above-mentioned program stored thereon.

Further, in one aspect of the present invention, the identification means is configured to identify the association relationship based on smallness of a difference between the first ratio of each voice and the second ratio of each piece of character information.

Further, in one aspect of the present invention, the identification means is configured to: acquire candidates of the association relationship based on smallness of a difference between the first ratio of each voice and the second ratio of each piece of character information; acquire, for each candidate, an amount of overall change in provisional display timing when an association relationship indicated by the each candidate is correct; acquire, for each candidate, a degree of deviation between a provisional display timing of each piece of character information and an output timing of each voice when the provisional display timing is changed based on the amount of overall change corresponding to the each candidate; and identify the association relationship from among the candidates based on the degree of deviation of each candidate.

Further, in one aspect of the present invention, the identification means is configured to identify the association relationship from among the candidates based on an algorithm that uses dynamic programming.

Further, in one aspect of the present invention, the display timing determination means is configured to: randomly extract a sample from among combinations of a voice and character information indicated by the association relationship; acquire an amount of overall change in provisional display timing based on the sample; acquire a degree of deviation between a provisional display timing of each piece of character information and an output timing of each voice when the provisional display timing is changed based on the change amount; and repeat extraction of the sample and acquisition of the change amount until the degree of deviation becomes smaller than a threshold value.

Further, in one aspect of the present invention, the first ratio acquisition means is configured to acquire, for each voice, the plurality of first ratios based on a plurality of combinations of the first order difference and the second order difference, the second ratio acquisition means is configured to acquire, for each piece of character information, the plurality of second ratios based on a plurality of combinations of the first order difference or third order difference and the second order difference or fourth order difference, and the identification means is configured to identify the association relationship based on the plurality of first ratios of each voice and the plurality of second ratios of each piece of character information.

Further, in one aspect of the present invention, the first order difference and the second order difference are the same predetermined number, the first ratio acquisition means is configured to acquire the first ratio of an interval between output timings of a voice and another voice the predetermined number after the voice in output order to an interval between output timings of the voice and another voice the predetermined number before the voice in output order, and the second ratio acquisition means is configured to acquire the second ratio of an interval between provisional display timings of a piece of character information and another piece of character information the predetermined number after the piece of information in display order to an interval between provisional display timings of the piece of character information and another piece of character information the predetermined number before the piece of information in display order.

Further, in one aspect of the present invention, the predetermined number is one, the first ratio acquisition means is configured to acquire the first ratio of an interval between output timings of a voice and another voice immediately after the voice in output order to an interval between output timings of the voice and another voice immediately before the voice in output order, and the second ratio acquisition means is configured to acquire the second ratio of an interval between provisional display timings of a piece of character information and another piece of character information immediately after the piece of information in display order to an interval between provisional display timings of the piece of character information and another piece of character information immediately before the piece of character information in display order.

Advantageous Effects of Invention

According to the present invention, it is possible to accurately identify the association relationship between a voice and character information without being influenced by change of voice storage data, to synchronize the output timing of a voice and the display timing of character information.

BRIEF DESCRIPTION OF DRAWINGS

FIG. 5 is a table for showing a data storage example of character information data.

DESCRIPTION OF EMBODIMENTS

1. Hardware Configuration of Display Timing Determination System

Figure 1:
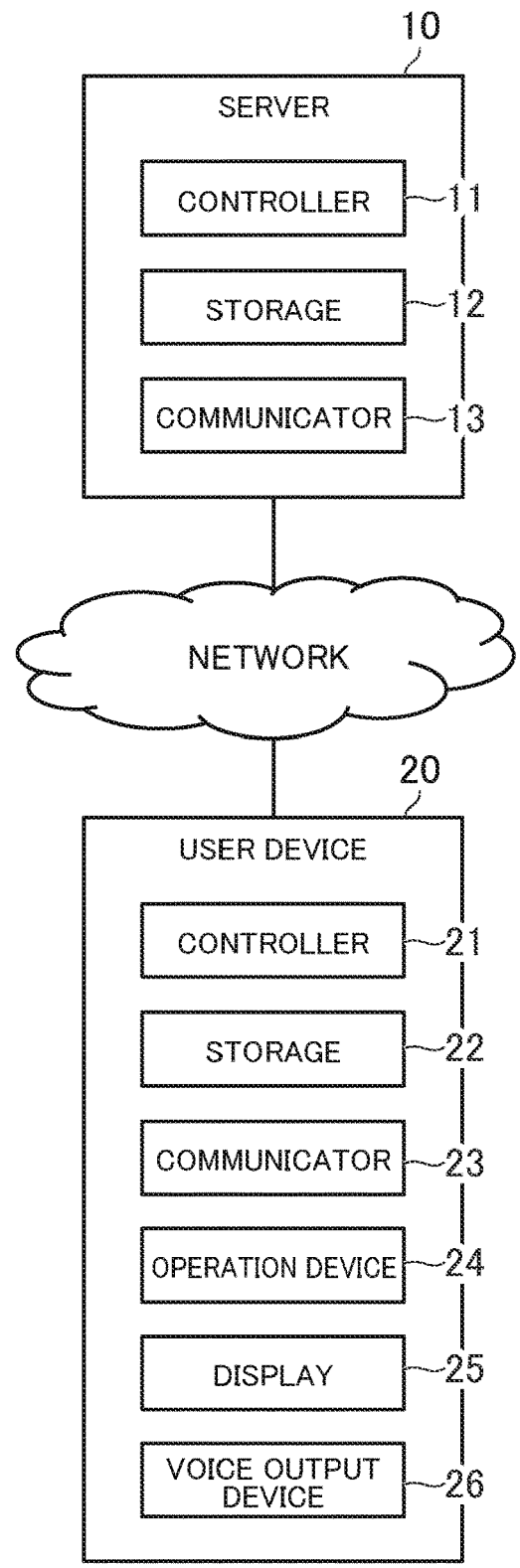
FIG. 1 is a diagram for illustrating an overall configuration of a display timing determination system.

In the following, a description is given of an example of a display timing determination system including a server, which is a display timing determination device according to an exemplary embodiment of the present invention. FIG. 1 is a diagram for illustrating an overall configuration of the display timing determination system. As illustrated in FIG. 1, the display timing determination system 1 includes a server 10 and a user device 20. Those devices may be communicably connected to each other via a network in a wired or wireless manner.

The server 10 is a server computer, and includes, for example, a controller 11, a storage 12, and a communicator 13. The controller 11 includes at least one processor. The controller 11 is configured to execute processing in accordance with a program and data stored in the storage 12. The storage 12 includes a main memory and an auxiliary storage. For example, the main memory is a volatile memory, for example, a RAM, and the auxiliary storage is a non-volatile memory such as a hard disk drive or a flash memory. The communicator 13 includes a communication interface for wired communication or wireless communication, and communicates data via a network, for example.

The user device 20 is a computer to be operated by a user, and is, for example, a personal computer, a portable information terminal (including tablet computer), or a cell phone (including smartphone). The user device 20 includes a controller 21, a storage 22, a communicator 23, an operation device 24, a display 25, and a voice output device 26. Hardware configurations of the controller 21, the storage 22, and the communicator 23 may be the same as those of the controller 11, the storage 12, and the communicator 13, respectively.

The operation device 24 is an input device for operation by the user, and is, for example, a pointing device such as a touch panel or a mouse, or a keyboard. The operation device 24 transmits operation content of the user to the controller 21. The display 25 is, for example, a liquid crystal display or an organic EL display, and can display various images such as a moving image and a still image. The voice output device 26 is, for example, a speaker, an earphone, or headphones, and can output various sounds and voices.

Programs and data to be described as being stored in the storages 12 and 22 may be supplied thereto via a network. Further, hardware configurations of the server 10 and the user device 20 are not limited to the above-mentioned example, and various kinds of pieces of computer hardware may be employed. For example, the server 10 and the user device 20 may each include a reader (e.g., optical disc drive or memory card slot) configured to read a computer-readable information storage medium, and an input/output device (e.g., USB port and image input/output terminal) for directly connecting to an external device. In this case, programs and data stored in the information storage medium may be supplied to the server 10 or the user device 20 via the reader or the input/output device.

2. Outline of Processing to be Executed by Display Timing Determination System

In this embodiment, the server 10 is configured to manage a plurality of moving images. For example, when the user designates a moving image that the user wishes to view, the user can view the moving image by downloading or streaming thereof. When the moving image is reproduced by the user device 20, subtitles are displayed on the display 25 together with the moving image, and voices of the moving image are output by the voice output device 26.

Figure 2:
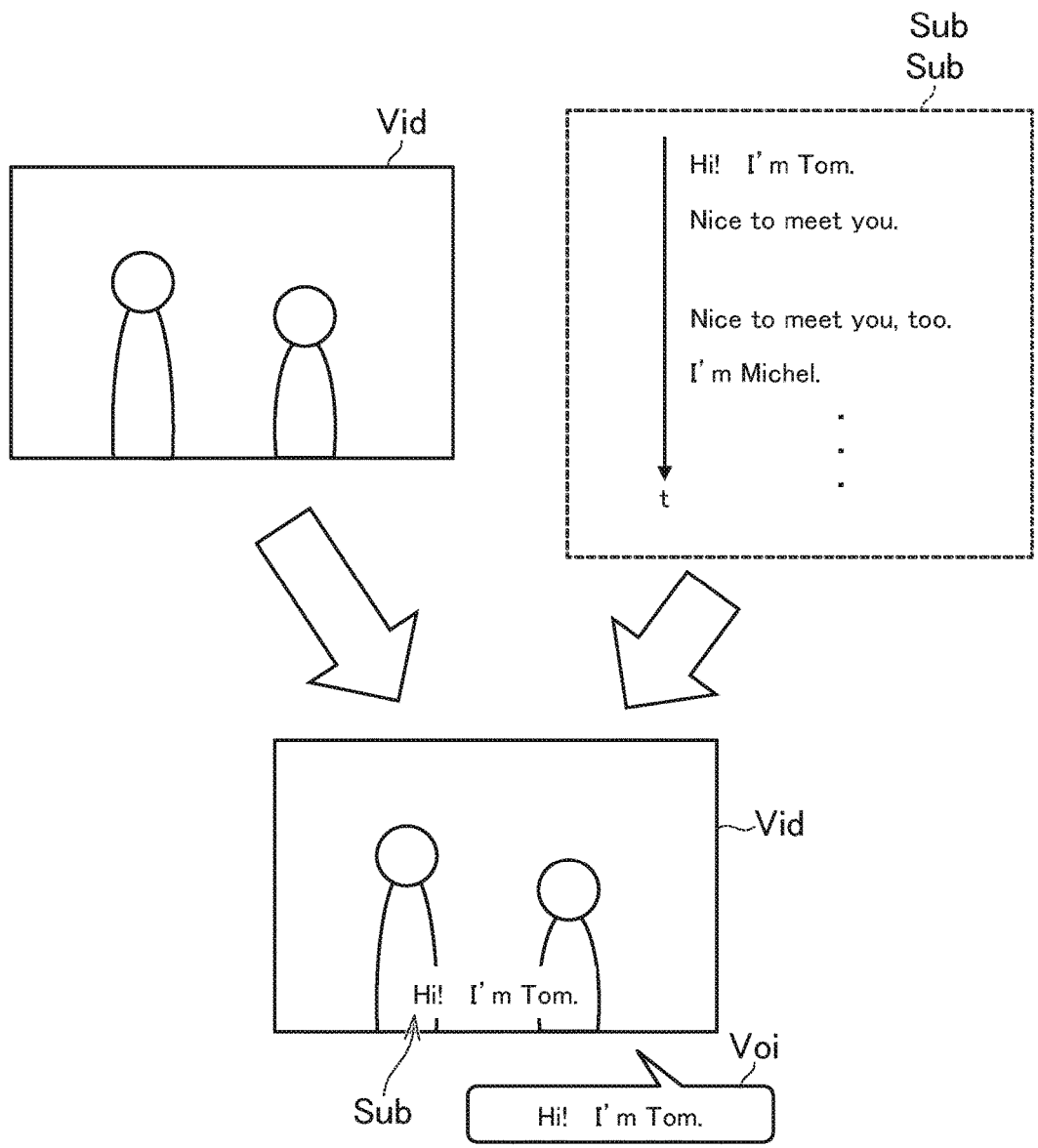
FIG. 2 is a diagram for illustrating an outline of processing to be executed at a time of reproduction of a moving image.

FIG. 2 is a diagram for illustrating an outline of processing to be executed when a moving image is reproduced. In FIG. 2, the moving image is denoted by a symbol Vid, the voice of the moving image is denoted by a symbol Voi, and the subtitle is denoted by a symbol Sub. As illustrated in FIG. 2, the server 10 manages pieces of data on the moving image Vid and the subtitle Sub separately. The t-axis of the subtitle Sub illustrated in FIG. 2 is a time axis, and subtitles to be displayed on a screen are illustrated in a chronological order on the time axis.

In this embodiment, the subtitle Sub is not embedded into the moving image Vid, but is managed separately from the moving image Vid. When the moving image Vid is displayed, as illustrated in FIG. 2, the moving image Vid and the subtitle Sub are combined. With this, when the voice Voi of the moving image is output, the subtitle Sub corresponding to the voice Voi is displayed.

For example, the server 10 transmits data on the moving image Vid and data on the subtitle Sub separately to the user device 20, and the user device 20 combines the subtitle Sub and the moving image Vid. Further, for example, the server 10 combines the subtitle Sub and the moving image Vid designated by the user, and transmits data on the moving image Vid obtained by the combination to the user device 20.

The subtitle Sub is created by any method at any timing before or after registration of the moving image Vid with the server 10. For example, a system administrator may manually input text of the subtitle Sub and the display timing of the subtitle Sub while viewing the moving image Vid, or use voice analysis to generate character data and display timing of the subtitle Sub.

Figure 3:
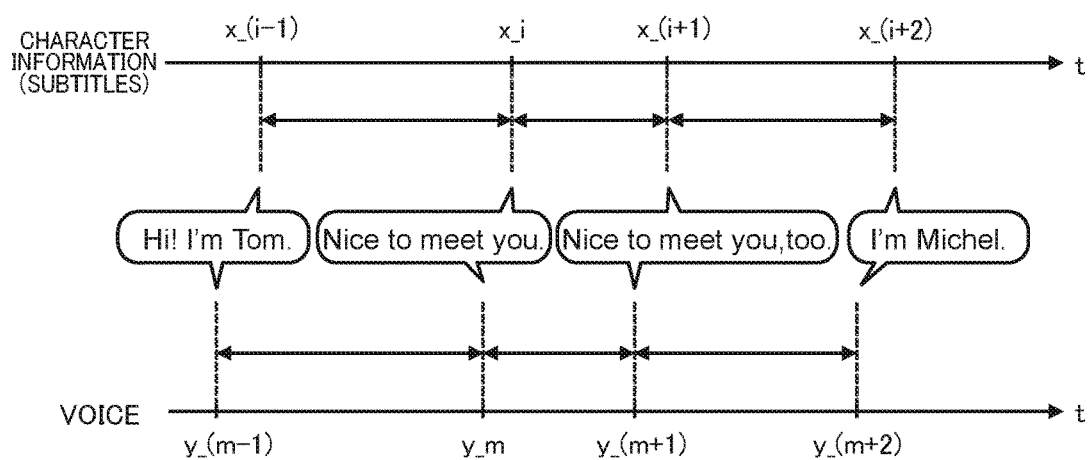
FIG. 3 is a diagram for illustrating a relationship between a display timing of a subtitle and an output timing of a voice.

FIG. 3 is a diagram for illustrating a relationship between a display timing of the subtitle Sub and an output timing of the voice. In FIG. 3, the display timing of the subtitle Sub is denoted by a symbol "x_i", and the output timing of the voice Voi is denoted by a symbol "y_m". Even when the system administrator creates character data and display timing of the subtitle Sub while viewing the moving image Vid, as illustrated in FIG. 3, the output timing of the voice Voi and the display timing of the subtitle Sub may deviate from each other due to various causes.

For example, the moving image Vid may contain a part called "credit" displaying, for example, names of the cast and the title of the moving image. In the moving image Vid distributed to users, the credit is sometimes edited, and the length of the credit of the moving image Vid for creation of subtitles and the length of the credit of the moving image Vid for distribution may be different from each other. In this case, the output of the voice Voi and the display timing of the subtitle Sub may deviate from each other by the difference in length of the credit. The display timing of the subtitle Sub is required to be shifted in an overall manner to adjust deviation due to the difference in length of the credit.

Further, for example, in the moving image Vid to be distributed to users, the frame rate is sometimes changed, and the frame rate of the moving image Vid for creation of subtitles and the frame rate of the moving image Vid for distribution may be different from each other. In this case, an interval between output timings of the voice Voi may change, and the output timing of the voice Voi and the display timing of the subtitle Sub may deviate from each other. In order to adjust deviation due to the difference in frame rate, it is required to change a scale (coefficient s of Expression 5) described later to adjust an interval between display timings of the subtitle Sub.

Further, for example, when the subtitle Sub is created for a DVD or a Blu-ray Disc, the subtitle Sub may jump in terms of time because of a file format. In this case, the output timing of the voice Voi and the display timing of the subtitle Sub may deviate from each other by a distance corresponding to the time jump. In order to adjust the deviation due to the time jump, it is required to shift the display timing of the subtitle Sub in an overall manner.

As described above, the output timing of the voice Voi and the display timing of the subtitle Sub may deviate from each other due to various causes. In this respect, when an association relationship between the voice Voi and the subtitle Sub can be identified, the deviation in timing can be alleviated by adjusting the display timing of the subtitle Sub so that the display timing of the subtitle Sub matches the output timing of the corresponding voice Voi. However, as described above, the output timing of the voice Voi is influenced by the change of the moving image Vid, and thus, even when the output timing of the voice Voi and the display timing of the subtitle Sub are compared with each other, identification of the association relationship between the voice Voi and the subtitle Sub is difficult.

Thus, the server 10 in this embodiment uses information (ratio described later) that is not influenced by the change of the moving image Vid to identify the association relationship between each voice and each piece of character information, to synchronize the output timing of a voice and the display timing of a character. In the following description, reference symbols assigned to the moving image, the voice, and the subtitle in FIG. 2 are omitted.

3. Functions Implemented in this Embodiment

Figure 4:
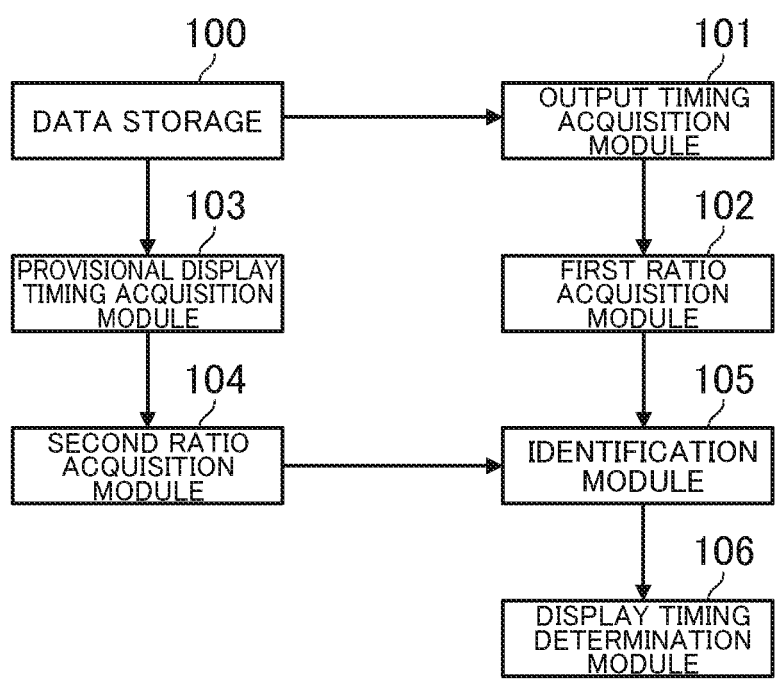
FIG. 4 is a functional block diagram for illustrating an example of functions to be implemented by the display timing determination system.

FIG. 4 is a functional block diagram for illustrating an example of functions to be implemented by the display timing determination system. As illustrated in FIG. 4, in this embodiment, a data storage 100, an output timing acquisition module 101, a first ratio acquisition module 102, a provisional display timing acquisition module 103, a second ratio acquisition module 104, an identification module 105, and a display timing determination module 106 are implemented in the server 10.

[3-1. Data Storage]

The storage 12 mainly implements the data storage 100. The data storage 100 stores data for outputting a voice and data for displaying character information. In this embodiment, a description is given of voice storage data and character information data as an example of data to be stored in the data storage 100. For example, when the character information data is prepared for each piece of voice storage data, the data storage 100 stores a combination thereof.

[Voice Storage Data]

The voice storage data is data storing a plurality of voices to be output sequentially. The voice may be obtained by recording sounds actually uttered by a person with a microphone, or may be a voice artificially synthesized by a computer. A period of time in which the voice storage data is reproduced (period from start of reproduction to end of reproduction) contains a plurality of periods in which voices are output. Each voice can be said to be a set of voices to be output in a certain period. The voice may contain at least one word, or may be divided in unit of sentences or formed of a plurality of sentences. Further, the voice may be a shout or a scream, which does not particularly contain a meaningful word. For example, the voice may be an individual line in, for example, a movie, a drama, or an animation, an individual utterance of a person appearing in a moving image, or an individual phrase of, for example, a song or a poem.

The voice storage data is only required to be data that can output voices by being reproduced, and may be, for example, moving image data storing one or more images and voices, or voice data that does not contain images. Various known formats may be employed as the data format and compression format of the moving image data and voice data. Examples of such formats include the avi format, the mpeg format, and the mp3 format. In this embodiment, a description is given of a case in which the voice storage data is moving image data.

When the voice storage data is reproduced, each voice stored in the voice storage data is output in a predetermined order and at a predetermined timing with an elapse of time. In other words, each voice is stored in the voice storage data so that the voice is output in a predetermined order and at a predetermined timing. The output timing of a voice may be any timing in a period during which the voice is output. For example, the timing may indicate a timing of starting to output the voice, a timing of ending output of the voice, or an intermediate timing thereof.

[Character Information Data]

The character information data is data on character information representing content of each voice, which is sequentially displayed during reproduction of the voice storage data. The character information represents content of the voice as at least one character, and for example, may be text such as subtitles, captions, or superimposed text. The character information may be formed of only one character, or may be a character string containing a plurality of characters. Further, the character information may contain symbols other than characters. Content of the character information is not required to be completely the same content as that of the voice word for word, and there may be some degree of difference between content of the voice and content of the character information. In this embodiment, a description is given of a case in which the voice storage data is moving image data, namely, a case in which the character information represents subtitles of a moving image.

FIG. 5 is a table for showing a data storage example of character information data. As shown in FIG. 5, the character information data stores a character information ID for uniquely identifying character information, a display timing of the character information, and the character information. It suffices that the character information data stores at least the display timing of character information, and for example, the character information itself may be stored in data different from the character information data.

The display timing stored in the character information data may represent any timing in a period during which the character information is displayed. For example, the display timing may indicate a timing of starting to display the character information, a timing of ending display of the character information, or an intermediate timing thereof. In this embodiment, a description is given of a case in which the start timing is used as the display timing. However, as shown in FIG. 5, the end timing and the length of a display time may also be stored in the character information data. The length of the display time may be different depending on the character information, or may be the same for all the pieces of character information.

The display timing set in advance in the character information data is adjusted by the display timing determination module 106 described later, and thus, in this embodiment, the display timing before adjustment is referred to as "provisional display timing", and the display timing after adjustment is referred to as "definitive display timing". The display timing determination module 106 described later finds such a definitive display timing as to match the output timing of a voice in an overall manner based on the provisional display timing.

In the following, the character information is denoted by i (i is an integer of from 1 to $N_i$, where $N_i$ represents a total number of pieces of character information), and a set of provisional display timings stored in the character information data is denoted by $\{x\_i\}$. For example, as shown in FIG. 5, when the character information ID is assigned from 1 to each piece of character information in chronological order, the value of i represents the character information ID, and represents a place in display order of the character information. As described above, in this embodiment, the timing of starting to display the character information i is a provisional display timing $x\_i$ of the character information i.

The character information may contain character information representing information other than a voice. The character information representing information other than a voice is character information having no corresponding voice, and is, for example, a description, a title, or notes. For example, when the voice storage data is moving image data, the name of a location shown in the moving image, the role or name of a character, the role name, or the titles of a movie, a TV program, an animation, and a song correspond to character information representing information other than a voice. When there is such character information, the display timing of the character information is required to be identified also for the character information, and thus the provisional display timing of the character information is also stored in the character information data.

[3-2. Output Timing Acquisition Module]

The controller 11 mainly implements the output timing acquisition module 101. The output timing acquisition module 101 acquires the output timings of a respective plurality of voices to be sequentially output. The output timing of each voice may be contained in the voice storage data, but in this embodiment, the output timing acquisition module 101 analyzes the voice waveform of the voice storage data to acquire the output timing of each voice.

For example, the output timing acquisition module 101 generates a spectrogram that chronologically represents the strength of a signal for each frequency based on the voice storage data. The spectrogram may be generated using a known sonograph, and for example, a band-pass filter or a short-time Fourier transform may be used. The sonograph is a general term for a device with an algorithm of generating a spectrogram. The output timing acquisition module 101 acquires a temporal change in strength (amplitude) indicated by the voice waveform for each frequency to generate a spectrogram.

Figure 6:
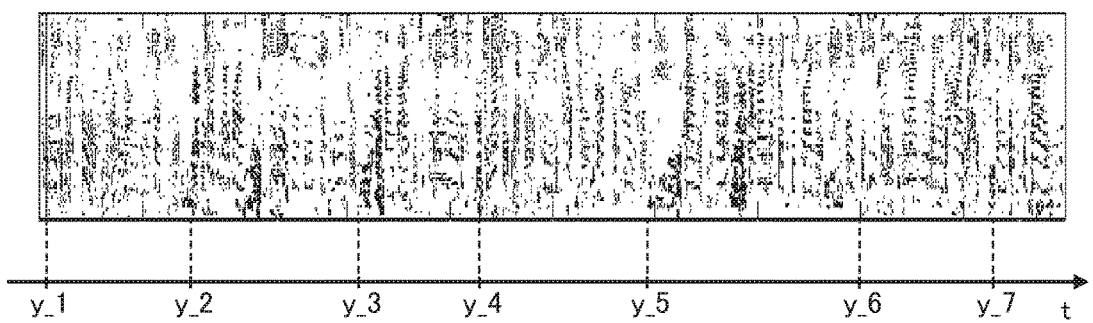
FIG. 6 is a diagram for illustrating an example of a spectrogram.

FIG. 6 is a diagram for illustrating an example of the spectrogram. In the spectrogram of FIG. 6, the vertical axis represents a frequency, and the horizontal axis represents time. The spectrogram often represents the strength of a signal of each frequency by color, but in FIG. 6, schematically represents the strength of a signal of each frequency in monochrome. In the example of FIG. 6, a darker frequency band represents a stronger intensity of sound, and a lighter frequency band represents a weaker intensity of sound.

The output timing acquisition module 101 executes deep learning (type of machine learning) based on the spectrogram to acquire the output timing of each voice. The pattern information representing a characteristic of a voice required for deep learning may be stored in the data storage 100. For example, when the intensity of a frequency band (e.g., 100 Hz to several thousands of Hz) corresponding to a voice is equal to or larger than a threshold value, the output timing acquisition module 101 determines that the voice is being output, whereas when the intensity of the frequency band is smaller than the threshold value, the output timing acquisition module 101 determines that the voice is not being output. The frequency band corresponding to the voice may be designated in advance, and may be variable depending on input by a system administrator.

For example, when the state of a voice not being output changes to the state of a voice being output, the output timing acquisition module 101 issues a voice ID for uniquely identifying the voice, and determines this timing of change as a timing of starting to output the voice identified by the voice ID. Then, when the state of the voice being output changes to the state of the voice not being output, the output timing acquisition module 101 determines this timing of change as a timing of ending output of the voice identified by the voice ID. A period of time from the start timing to the end timing is a period during which the voice identified by the voice ID is output. As described above, in this embodiment, a description is given of a case in which the timing of starting to output a voice is used as the output timing of the voice. However, the end timing and the length of the output period may also be held.

In the following, the voice is denoted by m (m is an integer of from 1 to $N_m$, where $N_m$ is a total number of voices), and a set of output timings is denoted by $\{y\_m\}$. For example, when the voice ID is assigned from 1 to each voice in chronological order, the value of m represents the voice ID, and represents a place in output order of the voice. In this embodiment, the start timing is used as the output timing, and thus the timing of starting to output the voice m is a timing $y\_m$ of outputting the voice m.

In this embodiment, a description is given of a case in which the output timing acquisition module 101 acquires the voice storage data from the data storage 100, but when the voice storage data is stored in a computer other than the server 10, the voice storage data may be acquired from the computer.

[3-3. First Ratio Acquisition Module]

The controller 11 mainly implements the first ratio acquisition module 102. The first ratio acquisition module 102 acquires a first ratio of an interval between output timings of voices that are different in output order by a first order difference to an interval between output timings of voices that are different in output order by a second order difference. The phrase "different in output order" refers to the fact that one output place in order is before or after another output place in order. The first ratio acquisition module 102 acquires the first ratio for each voice based on the output timing of each voice acquired by the output timing acquisition module 101.

The first order difference and the second order difference may be the same number or different numbers. Further, the first ratio may be calculated based on a plurality of intervals. For example, the first ratio may be calculated by dividing one interval by another interval or by substituting three or more intervals into a predetermined mathematical expression. For example, when three intervals are used, the ratio of a sum of a first interval and a second interval to a third interval may be used as the first ratio. Further, for example, when four intervals are used, the ratio of the sum of the first interval and the second interval to the sum of a third interval and a fourth interval may be used as the first ratio. Similarly, when five or more intervals are used, the first ratio may be calculated by substituting each interval into a predetermined mathematical expression. Further, the first ratio of each voice may be calculated by using both the intervals before and after the output timing of the voice, or may be calculated by using any one of intervals before and after the output timing of the voice, or may be calculated by using an interval containing the output timing of the voice.

In this embodiment, for simplicity of the description, a description is given of a case in which the first ratio is calculated by using two intervals. For example, the first ratio acquisition module 102 calculates the first ratio for each voice based on Expression 1 given below. When the number of voices contained in the voice storage data is denoted by $N_m$, the first ratio acquisition module 102 calculates $N_m$ first ratios based on Expression 1.

$$F(m) = \frac{[y\_(m + a) - y\_(m + b)]}{[y\_(m + c) - y\_(m + d)]} \quad \text{[Expression 1]}$$

The left side of Expression 1 represents the first ratio of a voice m. Symbols a, b, c, d in the right side of Expression 1 each represent any integer, and takes any one of a positive integer, a negative integer, or 0. The integers a and b correspond to the first order difference in the present invention, and the integers c and d correspond to the second order difference in the present invention.

As an example of the integer a, when the integer a is positive, a voice m+a is after the voice m by a in output order. On the contrary, when the integer a is negative, the voice m+a is before the voice m by an absolute value of the integer a in output order. When the integer a is 0, the voice m+a means the voice m. This holds true for the integers b, c, and d.

When the integer a is 0, there is no interval when the integer b is also 0. Thus, the integer b is an integer other than 0. On the contrary, when the integer b is 0, there is no interval when the integer a is also 0. Thus, the integer a is an integer other than 0. Similarly, when the integer c is 0, there is no interval when the integer d is also 0. Thus, the integer d is an integer other than 0. On the contrary, when the integer d is 0, there is no interval when the integer c is also 0. Thus, the integer c is an integer other than 0.

Further, when a combination of integers a and b and a combination of integers c and d are completely the same, the numerator and the denominator of Expression 1 are completely the same value, with the result that a first ratio F(m) takes a constant value (namely, 1). Thus, it is assumed that the combination of integers a and b and the combination of integers c and d are different from each other.

The numerator of the right side of Expression 1 indicates an interval between an output timing y_(m+a) of the voice m+a, which is different from the voice m in output order by a, and an output timing y_(m+b) of a voice m+b, which is different from the voice m in output order by b. The denominator of the right side of Expression 1 indicates an interval between an output timing y_(m+c) of a voice m+c, which is different from the voice m in output order by c, and an output timing y_(m+d) of a voice m+d, which is different from the voice m in output order by d.

For example, when a=1, b=0, c=−1, d=0 are satisfied, the first ratio acquisition module 102 acquires, as the first ratio F(m) of each voice m, a ratio of an interval between an output timing y_(m+1) of a voice m+1 and an output timing y_m of the voice m to an interval between an output timing y_(m−1) of a voice m−1 and an output timing y_m of the voice m. In this case, the first ratio acquisition module 102 acquires, as the first ratio F(m) of each voice m, a ratio of the interval between the voice m and the voice m+1 immediately after the voice m and the interval between the voice m and the voice m−1 immediately before the voice m.

As described above, when the first order difference and the second order difference are the same predetermined number (for example, when a=1, b=0, c=−1, d=0 are satisfied, and absolute values of a and c are both 1), the first ratio acquisition module 102 acquires, as the first ratio F(m), a ratio of an interval between output timings of a relevant voice and another voice the predetermined number after the relevant voice in output order to an interval between output timings of the relevant voice and another voice the predetermined number before the relevant voice in output order. Further, when the predetermined number is 1 (for example, when a=1, b=0, c=−1, and d=0 are satisfied, and absolute values of a and c are both 1), the first ratio acquisition module 102 acquires, as the first ratio F(m), a ratio of an interval between output timings of a relevant voice and another voice immediately after the relevant voice in output order to an interval between output timings of the relevant voice and another voice immediately before the relevant voice in output order.

[3-4. Provisional Display Timing Acquisition Module]

The controller 11 mainly implements the provisional display timing acquisition module 103. The provisional display timing acquisition module 103 acquires a provisional display timing of character information representing content of each voice, which is sequentially displayed during reproduction of a plurality of voices. In this embodiment, the provisional display timing of character information is stored in the character information data, and thus a description is given of a case of acquiring character information data from the data storage 100 by the provisional display timing acquisition module 103. When a computer other than the server 10 stores character information data, the character information data may be acquired from the computer.

[3-5. Second Ratio Acquisition Module]

The controller 11 mainly implements the second ratio acquisition module 104. The second ratio acquisition module 104 acquires, for each piece of character information, a second ratio of an interval between provisional display timings of pieces of character information that are different in display order by the first order difference or a third order difference corresponding to the first order difference to an interval between provisional display timings of pieces of character information that are different in display order by the second order difference or a fourth order difference corresponding to the second order difference. The second ratio acquisition module 104 acquires the second ratio for each piece of character information based on the provisional display timing of each piece of character information acquired by the provisional display timing acquisition module 103.

The meanings of the first order difference and the second order difference are the same as those described using the first ratio acquisition module 102. The third order difference is an order difference different from the first order difference, and the fourth order difference is an order difference different from the second order difference. The difference between the first order difference and the third order difference and the difference between the second order difference and the fourth order difference may be the same or different from each other. For example, when there is particularly no voice (e.g., screaming or sound effects) having no corresponding character information, the first order difference and the second order difference may be used to calculate the second ratio. Further, for example, when there is a voice having no corresponding character information, the third order difference whose absolute value is smaller than that of the first order difference and the fourth order difference whose absolute value is smaller than that of the second order difference may be used to calculate the second ratio. In this case, the first order difference and the third order difference may be different from each other by the number of voices having no corresponding character information. Further, the second order difference and the fourth order difference may be different from each other by the number of voices having no corresponding character information.

The second ratio may be calculated based on a plurality of intervals, for example, by dividing one interval by another interval, or may be calculated by substituting three or more intervals into a predetermined mathematical expression. For example, when three intervals are used, the ratio of the sum of the first interval and the second interval to the third interval may be used as the second ratio. Further, for example, when four intervals are used, the ratio of the sum of the first interval and the second interval to the sum of the third interval and the fourth interval may be used as the second ratio. Similarly in the case of using five or more intervals, the second ratio may be calculated by substituting each interval into a predetermined mathematical expression. Further, the second ratio of each sound may be calculated by using both the intervals before and after the provisional display timing of the character information, or may be calculated by using only any one of intervals before and after the character information, or may be calculated by using an interval including the output timing of the character information.

In this embodiment, for simplicity of the description, a description is given of a case in which the second ratio is calculated by using two intervals. For example, the second ratio acquisition module 104 calculates the second ratio for each piece of character information based on Expression 2 given below. When the number of pieces of character information contained in the character information data is denoted by $N_i$, the second ratio acquisition module 104 calculates $N_i$ second ratios based on Expression (2).

$$F(i) = \frac{[x\_(i+a) - x\_(i+b)]}{[x\_(i+c) - x\_(i+d)]} \qquad \text{[Expression 2]}$$

The left side of Expression 2 represents the second ratio of a piece i of character information. The integers a, b, c, d in the right side of Expression 2 may be the same values as those described in Expression 1 for calculating the first ratio F(m) of the voice m, or may be different values. The integers a and b correspond to the first order difference or the third order difference in the present invention, and the integers c and d correspond to the second order difference or the fourth order difference in the present invention.

When the integers a, b, c, d of Expression 1 and the integers a, b, c, d of Expression 2 are different from one another, it suffices that the integers a, b, c, d of Expression 2 have a predetermined relationship with the integers a, b, c, d of Expression 1, and may be set to values different from one another by a predetermined value. Further, the integers a, b, c, d of Expression 1 and the integers a, b, c, d of Expression 2 may all or partly be different from one another. For example, when one voice having no corresponding character information is inserted into the moving image, Expression 1 and Expression 2 may be set based on (a, b, c, d)=(2, 0, −2, 0) and (a, b, c, d)=(1, 0, −1, 0), respectively.

As an example of the integer a, when the integer a is positive, a piece i+a of character information is after the piece i of character information by a in display order. On the contrary, when the integer a is negative, the piece i+a of character information is before the piece i of character information by an absolute value of the integer a in display order. When the integer a is 0, the character information i+a means the character information i. This holds true for the integers b, c, and d.

The numerator of the right side of Expression 2 indicates an interval between a display timing x_(i+a) of the piece i+a of character information, which is different from the piece i of character information in display order by a, and a display timing x_(i+b) of a piece i+b of character information, which is different from the piece i of character information in display order by b. The denominator of the right side of Expression 2 indicates an interval between a display timing x_(i+c) of a piece i+c of character information, which is different from the piece i of character information in display order by c, and a display timing x_(i+d) of a piece i+d of character information, which is different from the piece i of character information in display order by d.

For example, when a=1, b=0, c=−1, d=0 are satisfied, the second ratio acquisition module 104 acquires, as the second ratio F(i) of each piece i of character information, a ratio of an interval between a display timing x_(i+1) of a piece i+1 of character information and a display timing x_i of the piece i of character information to an interval between a display timing x_(i−1) of a piece i−1 of character information and a display timing x_i of the piece i of character information. In this case, the second ratio acquisition module 104 acquires, as the second ratio F(i) of each piece i of character information, a ratio of the interval between the piece i of character information and the piece i+1 of character information immediately after the piece i of character information and the interval between the piece i of character information and the piece i−1 of character information immediately before the piece i of character information.

As described above, for example, when the first order difference and the second order difference are the same predetermined number (for example, when a=1, b=0, c=−1, d=0 are satisfied, and absolute values of a and c are both 1), the second ratio acquisition module 104 acquires, as the second ratio F(i), a ratio of an interval between provisional display timings of a relevant piece of character information and another piece of character information the predetermined number after the relevant piece of character information in display order to an interval between provisional display timings of the relevant piece of character information and another piece of character information the predetermined number before the relevant piece of character information in display order. Further, when the predetermined number is 1 (for example, when a=1, b=0, c=−1, and d=0 are satisfied, and absolute values of a and c are both 1), the second ratio acquisition module 104 acquires, as the second ratio F(i), a ratio of an interval between provisional display timings of a relevant piece of character information and another piece i+1 of character information immediately after the relevant piece of character information in display order to an interval between provisional display timings of the relevant piece of character information and another piece i−1 of character information immediately before the relevant piece of character information in display order.

[3-6. Identification Module]

The controller 11 mainly implements the identification module 105. The identification module 105 identifies an association relationship between each voice and each piece of character information based on the first ratio F(m) of each voice m and the second ratio F(i) of each piece i of character information. The association relationship is information indicating which sound and piece of character information are associated with each other. For example, the identification module 105 may identify a corresponding piece of character information for each voice, or may identify a corresponding voice for each piece of character information.

For example, the identification module 105 identifies an association relationship based on smallness of a difference between the first ratio F(m) of each voice m and the second ratio F(i) of each piece i of character information. For example, the identification module 105 identifies the association relationship between each voice and each piece of character information so that the difference is smaller than a threshold value. In this case, the identification module 105 may identify, for each voice m, the piece i of character information having the second ratio F(i) for which the difference from the first ratio F(m) of the voice m is smaller than the threshold value, or identify, for each piece i of character information, the voice m having the first ratio F(m) for which the difference from the second ratio F(i) of the piece i of character information is smaller than the threshold value.

Further, for example, the identification module 105 may identify, for each voice m, the piece i of character information having the second ratio F(i) for which the difference from the first ratio F(m) of the voice m is the smallest without particularly using a threshold value, or may identify, for each piece i of character information, the voice m having the first ratio F(m) for which the difference from the second ratio F(i) of the piece i of character information is the smallest. Further, for example, the identification module 105 may identify, for each voice m, a plurality of pieces of character information in order from smaller differences from the first ratio F(m) of the voice m to select a corresponding piece of character information from among the plurality of pieces of character information, or may identify, for the piece i of character information, a plurality of voices in order from smaller differences from the second ratio F(i) of the piece i of character information to select a corresponding voice from among the plurality of voices.

In this embodiment, a description is given of a case of using dynamic programming as an example of the method of identifying the association relationship between each voice and each piece of character information. For example, the identification module 105 selects, for each piece of character information, a plurality of voice candidates that may correspond to the piece of character information, and solves a shortest path problem with the voice candidates serving as nodes, to thereby identify the association relationship between each voice and each piece of character information. For example, as dynamic programming, a general Viterbi algorithm or Hidden Markov Model may be used.

Figure 7:
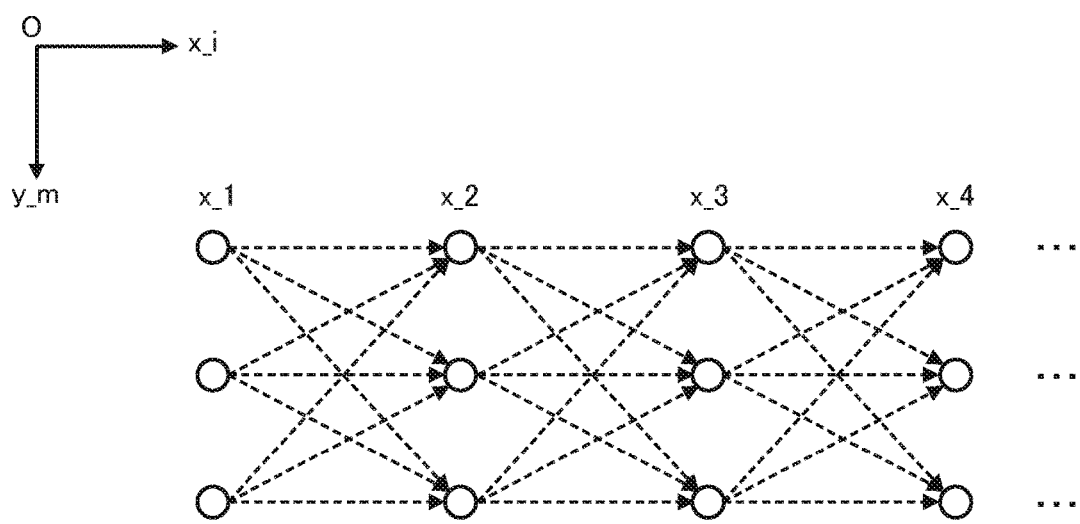
FIG. 7 is a diagram for illustrating a method of identifying an association relationship between a voice and character information.

FIG. 7 is a diagram for illustrating the method of identifying the association relationship between the voice and the character information. In FIG. 7, the provisional display timings x_i of the pieces i of character information are arranged in the horizontal direction, and the output timings of a plurality of (three in this case) voices are arranged in order of closeness to the second ratio F(i) of each piece i of character information in the vertical direction. Thus, the example of FIG. 7 is shown as a graph in which nodes are arranged in a grid pattern. Contrary to the example of FIG. 7, the output timings y_m of the voice m may be arranged in the horizontal direction and the provisional display timings x_i of the pieces i of character information may be arranged in the vertical direction.

The identification module 105 identifies the shortest path from the grid of FIG. 7 to identify the association relationship between each voice and each piece of character information. In the shortest path problem, costs for movement between nodes are determined, and a path that minimizes the total cost is calculated. In this embodiment, the identification module 105 identifies the shortest path based on two kinds of costs, namely, a node cost and a transition cost. For example, the identification module 105 calculates the node cost based on Expression 3 given below.

$$C_N(i,m)=d(F(i),F(m)) \qquad \text{[Expression 3]}$$

The left side of Expression 3 is a node cost of a node corresponding to the piece i of character information and the voice m. The node cost is calculated for each node illustrated in FIG. 7. As shown in the right side of Expression 3, the node cost is a distance (absolute value of difference) between the second ratio F(i) of each piece i of character information and the first ratio F(m) of the voice m. As the node cost becomes lower, the ratio for the piece i of character information and the ratio for the voice m become closer to each other, which means a high probability of correspondence between the piece i of character information and the voice m.

Further, for example, the identification module 105 calculates the transition cost based on Expression 4 given below.

$$C_T(i,m)=d([y\_m-y\_(m-1)],s*[x\_i-x\_(i-1)]) \qquad \text{[Expression 4]}$$

The left side of Expression 4 is a transition cost of a node corresponding to the piece i of character information and the voice m. The transition cost is calculated for each combination of a node and another node nearest thereto of the grid illustrated in FIG. 7. A symbol s of the right side of Expression 4 represents a scale on the assumption that the association relationship between the voice m and the piece i of character information is correct. Thus, the transition cost can be said to be information indicating a degree of deviation between the display timing $x\_i$ of the piece i of character information and the output timing $y\_m$ of the voice m obtained when the display timing $x\_i$ of the piece i of character information is changed on the assumption that the association relationship between the voice m and the piece i of character information is correct. It is indicated that, as the transition cost becomes lower, deviation between the definite display timing of the piece i of character information and the output timing of the voice becomes smaller, which means a higher probability of correspondence between the piece of character information and the voice.

The identification module 105 identifies a path for which the total sum of node costs and transition costs is the minimum, and identifies the association relationship between each voice and each piece of character information based on nodes on the path. The shortest path may be identified by using a formula used in the Viterbi algorithm without using the simple total sum of costs. Further, a description has been given of a case of solving the shortest path problem by using two costs, namely, the node cost and the transition cost. However, a single cost may be used.

As described above, in this embodiment, the identification module 105 acquires a candidate of the association relationship between the first ratio F(m) of each voice m and the second ratio F(i) of each piece i of character information. In the example of FIG. 7, nodes arranged in the grid pattern are examples of the candidate. Then, the identification module 105 acquires, for each candidate, the amount of overall change in provisional display timing when the association relationship indicated by the candidate is correct. For example, the overall change amount may be a shift amount (coefficient t of Expression 5 described later), but in this description, the overall change amount corresponds to the scale amount shown in Expression 4. Further, the identification module 105 acquires, for each candidate, the degree of deviation between the provisional display timing of each piece of character information and the output timing of each voice when the provisional display timing is changed based on a change amount corresponding to the candidate. This degree of deviation corresponds to the left side of Expression 4.

The identification module 105 identifies an association relationship among candidates based on the degree of deviation of each candidate. The identification module 105 determines a candidate with the smallest degree of deviation as the association relationship among the plurality of candidates. In this embodiment, dynamic programming is used to narrow down candidates, and thus the identification module 105 identifies the association relationship among the candidates based on an algorithm that uses dynamic programming.

[3-7. Display Timing Determination Module]

The controller 11 mainly implements the display timing determination module 106. The display timing determination module 106 determines the definitive display timing of each piece of character information based on the association relationship identified by the identification module 105. The display timing determination module 106 determines the definitive display timing by changing the provisional display timing of each piece of character information so that deviation between the provisional display timing of the piece of character information and the output timing of a voice corresponding to the piece of character information becomes smaller.

The display timing determination module 106 determines a change amount of a provisional display timing of each piece of character information based on the association relationship identified by the identification module 105. The display timing determination module 106 determines such a change amount as to reduce deviation between the output timing $y\_m$ of each voice m and the provisional display timing $x\_i$ of each piece i of character information, and determines the definitive display timing of each piece of character information based on the change amount.

For example, the display timing determination module 106 acquires match degree information based on the output timing $y\_m$ of each voice m and the provisional display timing $x\_i$ of each piece i of character information, to thereby determine the definitive display timing by changing the provisional display timing $x\_i$ so that the match degree indicated by the match degree information becomes higher. The match degree information is an indication of the degree of match in terms of timing. In other words, the match degree information is an indication of the amount of deviation in timing.

For example, it is indicated that, as the match degree indicated by the match degree information becomes higher (that is, as degree of deviation indicated by match degree becomes smaller), the timings are closer to each other, whereas, as the match degree indicated by the match degree information becomes lower (that is, as degree of deviation indicated by match degree becomes larger), the timings are farther from each other. The match degree information is indicated by a numerical value. The match degree information is calculated based on a difference in time between the output timing $y\_m$ and the provisional display timing $x\_i$, and the total sum thereof may be set as the match degree information, or a numerical value calculated based on a mathematical expression that uses those timings as variables may be set as the match degree information.

For example, the display timing determination module 106 acquires a plurality of change amounts of the provisional display timing of each piece of character information, and selects a change amount having the highest match degree indicated by the match degree information from among the plurality of change amounts. This change amount is a movement amount of the provisional display timing in terms of timing, and indicates how much the provisional display timing is caused to move forward or backward in terms of time. The change amount may be different depending on the character information, or the same change amount may be used among all the pieces of character information. In this embodiment, a description is given of a case in which the same change amount is used among all the pieces of character information. The change amount may be indicated by at least one numerical value, and for example, coefficients s and t of Expression 5 given below may be used as the change amount.

$$T(x\_i)=s*x\_i+t \qquad \text{[Expression 5]}$$

The left side of Expression 5 is a candidate for the definitive display timing. The coefficient s of the right side of Expression 5 is an amount of change in interval between the provisional display timings $x\_i$. When the coefficient s is changed to a larger value, the display time of the entire character information i extends, and thus the coefficient s indicates a scale of the character information i. Meanwhile, the coefficient t is a movement amount when the provisional display timing x_i is shifted in an overall manner. When the coefficient t is changed, the character information i moves forward or backward in an overall manner, and thus the coefficient t indicates a parallel movement amount.

As described above, the display timing determination module 106 acquires a plurality of combinations of the coefficients s and t, which are change amounts of the provisional display timing x_i. The plurality of combinations are different from one another in value of at least one of the coefficients s and t. A known sample extraction method can be employed as the method of acquiring the combination of coefficients s and t. For example, the combination of coefficients s and t may be extracted based on the random sample consensus algorithm (RANSAC), or the combination of coefficients s and t may be designated by a system administrator in advance. The number of acquired combinations may be freely selected, and for example, tens to hundreds of samples may be extracted.

The display timing determination module 106 identifies, for each change amount, coefficients s and t for which the total sum of differences between the provisional display timings T (x_i) of respective pieces i of character information, which are obtained by being changed by the change amount, and the output timings y_m of the corresponding voices m is the smallest. Then, the display timing determination module 106 determines the definitive display timing based on the coefficient s and t.

The method of determining the display timing is not limited to the above-mentioned example. For example, the display timing determination module 106 may determine, for each piece of character information, the display timing of the piece of character information so that the display timing of the piece of character information matches the output timing of a voice corresponding to the piece of character information, without acquiring the overall change amount. Further, for example, the display timing determination module 106 may determine, for each piece of character information, the display timing of the piece of character information so that a difference between the display timing of the piece of character information and the output timing of a voice corresponding to the piece of character information is smaller than a threshold value. That is, the display timing determination module 106 may acquire the change amount for an individual piece of character information. In other cases, for example, the display timing determination module 106 may calculate, for example, such a scale as to match the first ratio with the second ratio.

Further, in this embodiment, a description is given of a case in which the start timing of each piece of character information corresponds to the display timing thereof. However, the display timing determination module 106 may also change the end timing and display time of each piece of character information in accordance with change in start timing.

4. Processing to be Executed in this Embodiment

Figure 8:
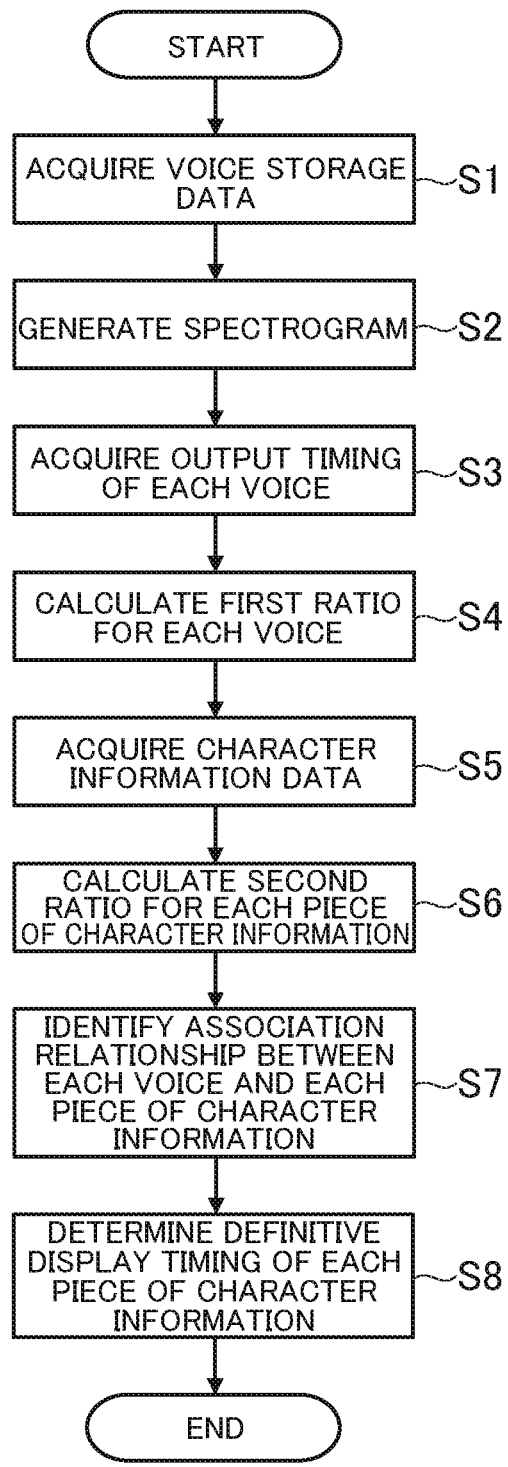
FIG. 8 is a flowchart for illustrating an example of processing to be executed by a server.

FIG. 8 is a flowchart for illustrating an example of processing to be executed by the server 10. The processing illustrated in FIG. 8 is an example of processing to be executed by the functional blocks illustrated FIG. 4, and is executed by the controller 11 operating in accordance with a program stored in the storage 12. The processing illustrated in FIG. 8 may be executed when a predetermined condition is satisfied. For example, the processing illustrated in FIG. 8 may be executed when the voice storage data and character information data are registered with the server 10, or may be executed at any timing, for example, instruction by a system administrator.

As illustrated in FIG. 8, first, the controller 11 acquires voice storage data stored in the storage 12 (Step S1). The controller 11 generates a spectrogram based on the voice storage data acquired in Step S1 (Step S2). In Step S2, as described above, the controller 11 uses a sonograph to perform frequency analysis for the voice storage data to chronologically acquire the strength of a signal for each frequency, to thereby generate a spectrogram.

The controller 11 acquires the output timing y_m of each voice m based on the spectrogram generated in Step S2 (Step S3). In Step S3, the controller 11 acquires the start timing at which the voice starts to be output by retrieving a time at which the strength of a sound in a predetermined frequency band is equal to or larger than a threshold value in chronological order from the beginning of the reproduction time of the voice storage data. When the controller 11 acquires the start timing of the first voice, the controller 11 assigns the voice with a voice ID=1. Next, the controller 11 retrieves a time at which the intensity of a sound in a predetermined frequency band is smaller than the threshold value, to thereby acquire the end timing at which output of the voice is ended. When the controller 11 acquires the end timing of the first voice, the storage 12 may hold the end timing and an output period of the first voice. After that, the controller 11 repeats the above-mentioned processing until the end of the reproduction time of the voice storage data, and increments the voice ID each time the start timing of the voice is found to cause the storage 12 to hold the start timing and other data.

The controller 11 calculates the first ratio F(m) for each voice m acquired in Step S3 based on the output timing y_m of the voice m (Step S4). In Step S4, the controller 11 calculates the first ratio F(m) for each voice m based on Expression 1 described above for storage into the storage 12.

The controller 11 acquires the character information data stored in the storage 12 (Step S5). The controller 11 calculates the second ratio F(i) for each piece i of character information based on the character information acquired in Step S5 (Step S6). In Step S6, the controller 11 calculates the second ratio F(i) for each piece i of character information based on Expression 2 described above for storage into the storage 12.

The controller 11 identifies the association relationship between each voice and each piece of character information based on the first ratio F(m) of each voice m calculated in Step S4 and the second ratio F(i) of each piece i of character information calculated in Step S6 (Step S7). In Step S7, the controller 11 sets, for each piece of character information, nodes by identifying a predetermined number of voices in order from smaller differences of the ratio based on the dynamic programming algorithm described with reference to FIG. 7. Then, the controller 11 calculates the node cost and the transition cost based on Expression 3 and Expression 4 described above to identify the shortest path with the minimum total sum of costs. Then, the controller 11 identifies the association relationship between each voice and each piece of character information based on nodes on the shortest path.

The controller 11 determines the definite display timing of each piece of character information based on the association relationship between each voice and each piece of character information (Step S8), and ends the processing. In Step S8, the controller 11 acquires a plurality of candidates of the coefficients s and t of Expression 5, and calculates candidates of the definitive display timing of character information. Then, the controller 11 determines the definitive display timing based on the coefficients s and t that achieve the minimum total sum of differences between display timings of pieces of the character information and the output timings of corresponding voices.

According to the display timing determination system 1 described above, it is possible to accurately identify the association relationship between the voice and the character information by using a ratio that is not influenced by factors such as the amount of overall shift in timing or scale, to synchronize the output timing of a voice with the display timing of character information. That is, as shown in Expression 1, for example, even when the output timing of a voice has shifted in an overall manner or the scale has changed, the value of the ratio is not influenced. Thus, it is possible to identify the association relationship between the voice and the character information by comparing ratios, which are features that are not changed even when the voice output data is changed, with each other. Further, it is possible to identify the association relationship without consideration of factors such as the overall shift amount and the scale, which enables identification of the association relationship between the voice and the character information by relatively simple processing. Therefore, it is possible to improve the processing speed of the server 10 and alleviate the processing load on the server 10.

Further, it is possible to improve the accuracy of identifying the association relationship between the voice and the character information by identifying the association relationship based on smallness of the difference between the first ratio F(m) of each voice m and the second ratio F(i) of each piece i of character information.

Further, the change amount of the provisional display timing of character information is calculated for each candidate of the association relationship, which is identified based on smallness of the difference between the first ratio F(m) of each voice m and the second ratio F(i) of each piece i of character information. Then, the association relationship is identified from among those candidates based on the degree of overall deviation in timing. In this manner, it is possible to effectively improve the accuracy of identifying the association relationship between the voice and the character information.

Further, it is possible to effectively improve the accuracy of identifying the association relationship between the voice and the character information by identifying the association relationship from among candidates based on an algorithm that uses dynamic programming. Further, various kinds of relatively high-speed dynamic programming algorithms have been developed, and thus it is possible to effectively improve the processing speed of the server 10 and alleviate the processing load on the server 10. Further, as described in the embodiment, it is possible to effectively improve the accuracy of identifying the association relationship between the voice and the character information by using a plurality of costs such as the node cost and the transition cost without using a single cost.

Further, the first order difference and the second order difference are the same predetermined number, the first ratio F(m) is acquired for each voice m based on an interval between voices the predetermined number before and after the voice m, and the second ratio F(i) is acquired for each piece i of character information based on an interval between pieces of character information the predetermined number before and after the piece i of character information. In this manner, it is possible to improve the accuracy of identifying the association relationship between the voice and the character information. Further, the algorithm can be made simple, and thus is it possible to improve the processing speed of the server 10 and alleviate the processing load on the server 10.

Further, the first ratio F(m) is acquired for each voice m based on the interval between the voice m and another voice immediately before the voice m and the interval between the voice m and another voice immediately after the voice m. Then, the second ratio F(i) is acquired for each piece i of character information based on the interval between the piece i of character information and another piece of character information immediately before the piece i of character information and the interval between the piece i of character information and another piece of character information immediately after the piece i of character information. In this manner, it is possible to improve the accuracy of identifying the association relationship between the voice and the character information. Further, the algorithm can be made simpler, and thus is it possible to improve the processing speed of the server 10 and alleviate the processing load on the server 10.

5. Modification Examples

The present invention is not limited to the embodiment described above, and can be modified suitably without departing from the spirit of the present invention.

(1) For example, in the embodiment, a description has been given of a case of using dynamic programming, but adjustment of the display timing of character information may be executed by another method. In a modification example (1) of the present invention, a description is given of a case of adjusting the display timing of character information using a RANSAC method. In this modification example, the identification module 105 identifies the piece i of character information with the second ratio F(i) closest to the first ratio F(m) of each voice m. However, the association relationship between each voice and each piece of character information may be identified based on the method described in the embodiment.

The display timing determination module 106 randomly extracts a sample from among combinations of a voice and character information indicated by the association relationship identified by the identification module 105. The sample may be a combination of a voice and character information or a plurality of combinations of a voice and character information. The method of randomly extracting a sample may be a method used in the RANSAC method, and for example, the sample may be extracted from a set of voices and pieces of character information based on a random number.

The display timing determination module 106 acquires the amount of overall change in provisional display timing based on the sample. The change amount is, for example, a combination of the coefficients s and t of Expression 5. The display timing determination module 106 determines the combination of the coefficients s and t so that the difference between the output timing of a voice and the provisional display timing of character information indicated by the sample is reduced.

The display timing determination module 106 acquires the degree of deviation between the display timing of each piece of character information and the output timing of each voice when the provisional display timing of the piece of character information is changed based on the change amount. The degree of deviation may indicate the degree of deviation in overall timing, and is, for example, the total sum of differences between the provisional display timings of respective pieces of character information and the output timings of corresponding voices. The display timing determination module 106 repeats extraction of samples and acquisition of change amounts until the degree of deviation becomes smaller than a threshold value. When the degree of deviation becomes smaller than the threshold value, the display timing determination module 106 stops extraction of samples and acquisition of change amounts, changes the provisional display timing of each piece of character information based on the current change amount, and sets the changed provisional display timing as the definitive display timing.

According to the modification example (1), it is possible to identify the association relationship between the voice and the character information and adjust the deviation in timing with relatively simple processing. Therefore, it is possible to effectively improve the processing speed of the server 10 and alleviate the processing load on the server 10.

(2) Further, for example, the plurality of first ratios F(m) may be acquired for each voice m, and the plurality of second ratios F(i) may be acquired for each piece i of character information. The first ratio acquisition module 102 in a modification example (2) of the present invention acquires, for each voice m, the plurality of first ratios F(m) based on a plurality of combinations of the first order difference and the second order difference. The plurality of combinations of the first order difference and the second order difference mean that there are a plurality of combinations of the integers a, b, c, and d in Expression 1. The second ratio acquisition module 104 acquires, for each piece i of character information, the plurality of second ratios F(i) based on the plurality of combinations of the first order difference or third order difference and the second order difference or fourth order difference. The plurality of combinations of the first order difference or third order difference and the second order difference or fourth order difference mean that there are a plurality of combinations of the integers a, b, c, and d in Expression 2.

The identification module 105 identifies the association relationship based on the plurality of first ratios F(m) of each voice m and the plurality of second ratios F(i) of each piece i of character information. For example, the identification module 105 identifies the association relationship based on smallness of a difference between a value that is calculated based on the plurality of first ratios F(m) of each voice m and a value that is calculated based on the plurality of second ratios F(i) of each piece i of character information. Further, for example, the identification module 105 identifies the association relationship based on smallness of the total sum of differences between the respective plurality of first ratios F(m) of each voice m and the respective plurality of second ratios F(i) of each piece i of character information.

According to the modification example (2), it is possible to improve the accuracy of identifying the association relationship between the voice and the character information by using a plurality of ratios. For example, when there is an error in the provisional display timing of character information, there may occur an error in the association relationship between the voice and the character information. However, it is possible to alleviate the influence of such an error by using a plurality of ratios.

(3) Further, for example, in the embodiment and the modification examples, the output timing of a voice and the display timing of character information are set to the respective start timings thereof. However, other information may be used to identify the output timing of a voice and the display timing of character information. For example, a time difference between output timings of a voice and a time difference between display timings of character information may be stored into a first array and a second array, respectively, so that the output timing of a voice and the display timing of character information can be identified. In this case, the display timing determination module 106 determines the definitive display timing of each piece of character information by changing the time difference stored in the second array.

Further, for example, the user device 20 may implement the output timing acquisition module 101, the first ratio acquisition module 102, the provisional display timing acquisition module 103, the second ratio acquisition module 104, the identification module 105, and the display timing determination module 106. In this case, the controller 21 mainly implements each function, and the user device 20 corresponds to the display timing determination device according to the present invention. Alternatively, for example, computers other than the server 10 and the user device 20 may implement the output timing acquisition module 101, the first ratio acquisition module 102, the provisional display timing acquisition module 103, the second ratio acquisition module 104, the identification module 105, and the display timing determination module 106. In this case, the computer corresponds to the display timing determination device according to the present invention.

The invention claimed is:

1. A display timing determination device, comprising at least one processor configured to:
    acquire respective output timings of a plurality of voices to be output sequentially,
    acquire, for each voice, a first ratio of an interval between output timings of voices that are different in output order by a first order difference to an interval between output timings of voices that are different in output order by a second order difference;
    acquire provisional display timings of pieces of character information, which are sequentially displayed during reproduction of the plurality of voices and represent content of the respective plurality of voices;
    acquire, for each piece of character information, a second ratio of an interval between provisional display timings of pieces of character information that are different in display order by the first order difference or a third order difference corresponding to the first order difference to an interval between provisional display timings of pieces of character information that are different in display order by the second order difference or a fourth order difference corresponding to the second order difference;
    identify, based on the first ratio of each voice and the second ratio of each piece of character information, an association relationship between the voice and the piece of character information; and
    determine definitive display timing of each piece of character information based on the association relationship.

2. The display timing determination device according to claim 1, wherein the at least one processor is configured to identify the association relationship based on a difference between the first ratio of each voice and the second ratio of each piece of character information.

3. The display timing determination device according to claim 2, wherein the at least one processor is configured to:

acquire candidates of the association relationship based on a difference between the first ratio of each voice and the second ratio of each piece of character information;

acquire, for each candidate, an amount of overall change in provisional display timing when an association relationship indicated by the each candidate is correct;

acquire, for each candidate, a degree of deviation between a provisional display timing of each piece of character information and an output timing of each voice when the provisional display timing is changed based on the amount of overall change corresponding to the each candidate; and identify the association relationship from among the candidates based on the degree of deviation of each candidate.

4. The display timing determination device according to claim 3, wherein the at least one processor is configured to identify the association relationship from among the candidates based on an algorithm that uses dynamic programming.

5. The display timing determination device according to claim 1, wherein the at least one processor is configured to:

randomly extract a sample from among combinations of a voice and character information indicated by the association relationship;

acquire an amount of overall change in provisional display timing based on the sample;

acquire a degree of deviation between a provisional display timing of each piece of character information and an output timing of each voice when the provisional display timing is changed based on the change amount; and repeat extraction of the sample and acquisition of the change amount until the degree of deviation becomes smaller than a threshold value.

6. The display timing determination device according to claim 1, wherein the at least one processor is configured to:

acquire, for each voice, the plurality of first ratios based on a plurality of combinations of the first order difference and the second order difference, acquire, for each piece of character information, the plurality of second ratios based on a plurality of combinations of the first order difference or third order difference and the second order difference or fourth order difference, and identify the association relationship based on the plurality of first ratios of each voice and the plurality of second ratios of each piece of character information.

7. The display timing determination device according to claim 1, wherein the first order difference and the second order difference are the same predetermined number, and wherein the at least one processor is configured to:

acquire the first ratio of an interval between output timings of a voice and another voice the predetermined number after the voice in output order to an interval between output timings of the voice and another voice the predetermined number before the voice in output order, and acquire the second ratio of an interval between provisional display timings of a piece of character information and another piece of character information the predetermined number after the piece of information in display order to an interval between provisional display timings of the piece of character information and another piece of character information the predetermined number before the piece of information in display order.

8. The display timing determination device according to claim 7, wherein the predetermined number is one, and wherein the at least one processor is configured to:

acquire the first ratio of an interval between output timings of a voice and another voice immediately after the voice in output order to an interval between output timings of the voice and another voice immediately before the voice in output order, and acquire the second ratio of an interval between provisional display timings of a piece of character information and another piece of character information immediately after the piece of information in display order to an interval between provisional display timings of the piece of character information and another piece of character information immediately before the piece of character information in display order.

9. A display timing determination method, comprising:

acquiring respective output timings of a plurality of voices to be output sequentially;

acquiring, for each voice, a first ratio of an interval between output timings of voices that are different in output order by a first order difference to an interval between output timings of voices that are different in output order by a second order difference;

acquiring provisional display timings of pieces of character information, which are sequentially displayed during reproduction of the plurality of voices and represent content of the respective plurality of voices;

acquiring, for each piece of character information, a second ratio of an interval between provisional display timings of pieces of character information that are different in display order by the first order difference or a third order difference corresponding to the first order difference to an interval between provisional display timings of pieces of character information that are different in display order by the second order difference or a fourth order difference corresponding to the second order difference;

identifying, based on the first ratio of each voice and the second ratio of each piece of character information, an association relationship between the voice and the piece of character information; and determining a definitive display timing of each piece of character information based on the association relationship.

10. A non-transitory computer-readable information storage medium having stored thereon a program for causing a computer to:

acquire respective output timings of a plurality of voices to be output sequentially;

acquire, for each voice, a first ratio of an interval between output timings of voices that are different in output order by a first order difference to an interval between output timings of voices that are different in output order by a second order difference;

acquire provisional display timings of pieces of character information, which are sequentially displayed during reproduction of the plurality of voices and represent content of the respective plurality of voices;

acquire for each piece of character information, a second ratio of an interval between provisional display timings of pieces of character information that are different in display order by the first order difference or a third order difference corresponding to the first order difference to an interval between provisional display timings of pieces of character information that are different in display order by the second order difference or a fourth order difference corresponding to the second order difference;

identify, based on the first ratio of each voice and the second ratio of each piece of character information, an association relationship between the voice and the piece of character information; and determine a definitive display timing of each piece of character information based on the association relationship.

* * * * *